Figure 1:
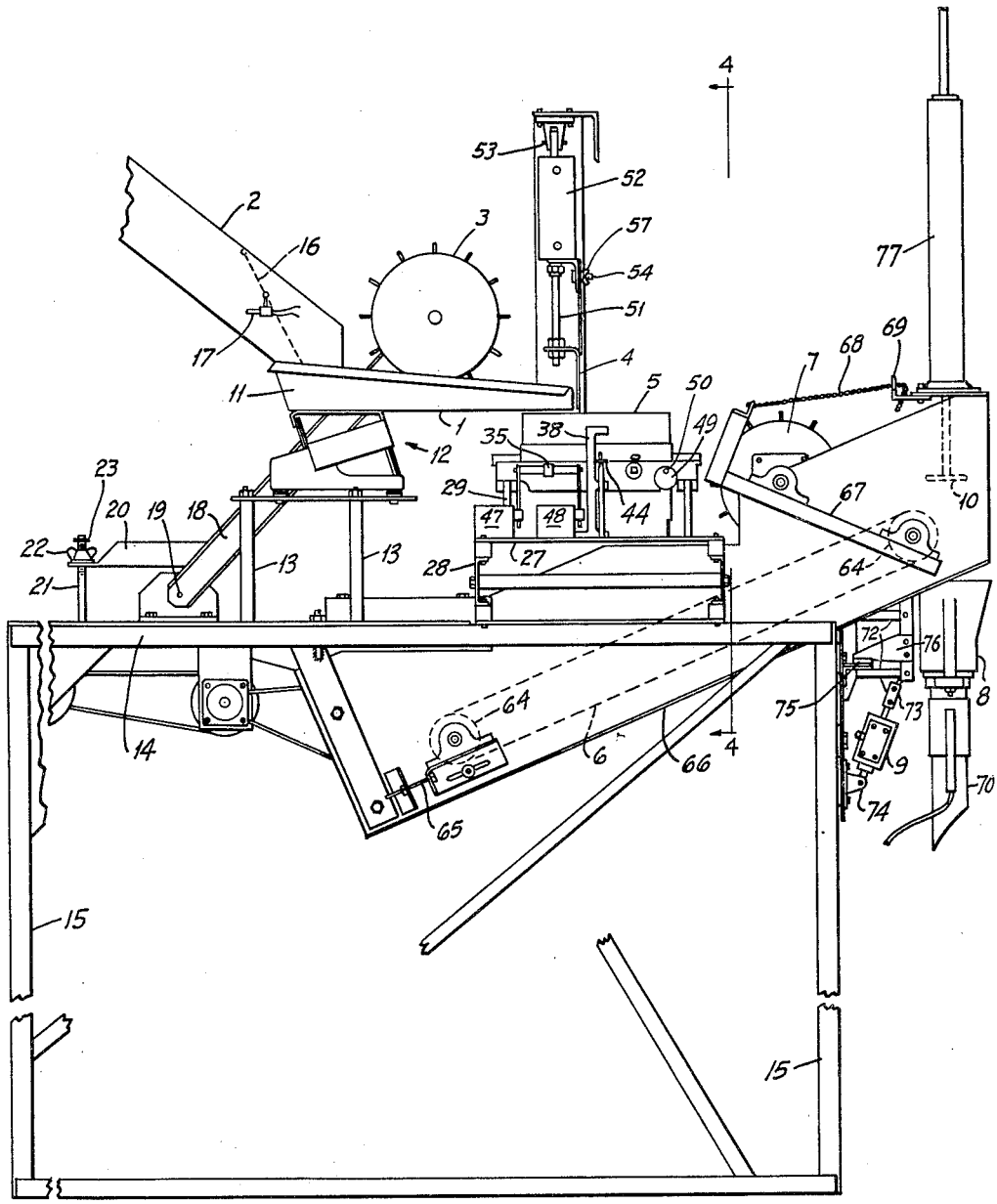

INVENTORS
Frank F. Lindstaedt
Selmer A. Melbostad
Fred S. Wright

By A. Schapp
ATTORNEY

2,781,994

BAG FILLING AND WEIGHING MACHINE

Frank F. Lindstaedt, San Anselmo, Selmer A. Melbostad, San Francisco, and Fred S. Wright, Sonoma, Calif.; said Melbostad assignor to said Lindstaedt Application January 29, 1951, Serial No. 208,412

4 Claims. (Cl. 249—46)

The present invention relates to improvements in a bag filling and weighing machine and the present application contemplates further improvements in the machine described in the application filed by Frank F. Lindstaedt and Charles R. Fischer under Serial Number 754,490, now Patent No. 2,546,193.

In the former application it was proposed to provide a bag filling and weighing machine particularly adapted for use in connection with potato chips, while the machine of the present invention is particularly intended for use in connection with noodles, although it may be used to advantage on other products such as potato chips, nuts, etc.

Noodles in dry state offer particular problems in bag filling and weighing operations insofar as they are fragile, break easily, have a tendency to bunch and resist settling into a reasonably compact mass for accommodation in a bag of reasonable proportions. While a limited amount of breaking up of the noodles in the filling process may be permitted, care must be taken to confine the breaking up within narrow limits, and it is one of the objects of the present invention to provide for a controlled breaking up of the noodles, sufficient to avoid bunching and to allow a desired amount to be accommodated in a relatively small bag but not sufficient to affect the quality and merchantability of the noodles.

It is further proposed to provide a machine that will weigh and fill at appreciably higher speed than has been done heretofore, and this is accomplished in part by separating the filling operation from the weighing operation, so that one part of the machine is engaged in filling the bag with a previously weighed load, while another part is engaged, at the same time, in weighing out a new load, without having to wait for the completion of the filling operation.

It is further proposed to provide a machine that will weigh out the material for each filling operation with greater accuracy than has been obtained heretofore. This is accomplished in part by adding two features to the conventional vibrator feed used in apparatus of this character, namely, the providing of means whereby the feed for the weighing apparatus is reduced to a dribble feed toward the end of each weighing operation and of additional means for braking the descent of the weighed material as the scale balance begins to tip under the weight of the material.

It is additionally proposed to provide, at various stages in the advance of the material through the machine, rotary combs engaging in the surface of the material and tending to break up bunch formations and to smoothen out the flow of the material.

It is a further feature of the present invention to provide a vibrating hopper as feeding means for a bag attached thereto, the hopper, or a part thereof, being made to thump against a fixed, but preferably cushioned object toward the end of each downward stroke to cause more perfect settling of the material in the bag.

And finally, it is proposed to provide means for levelling off the surface of the contents of a filled bag to a definite height so that all the bags are filled to the same height and contain a uniformly compacted mass of material.

Further objects and advantages of our invention will appear as the specification proceeds, and the novel features of our invention will be fully defined in the claims attached hereto.

Figure 2:
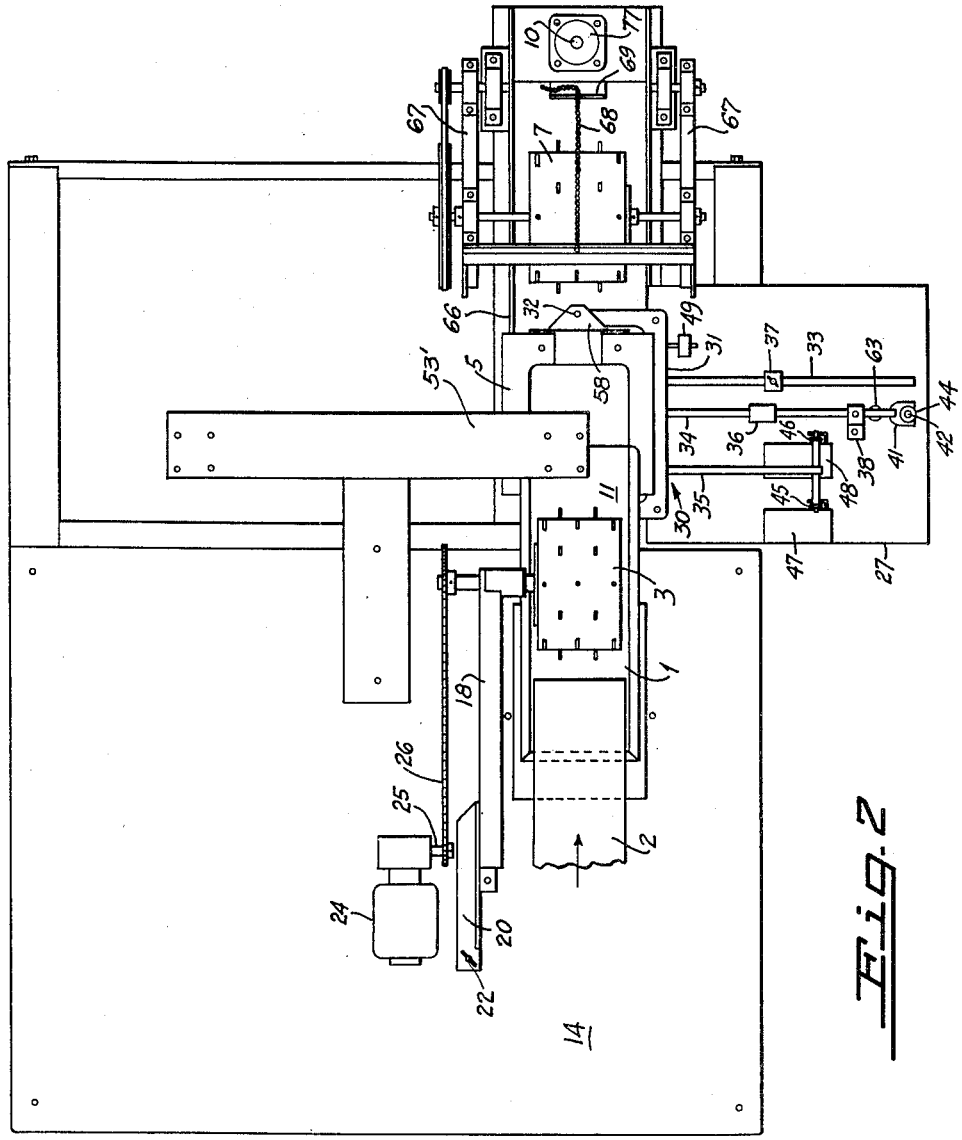
Figure 3:
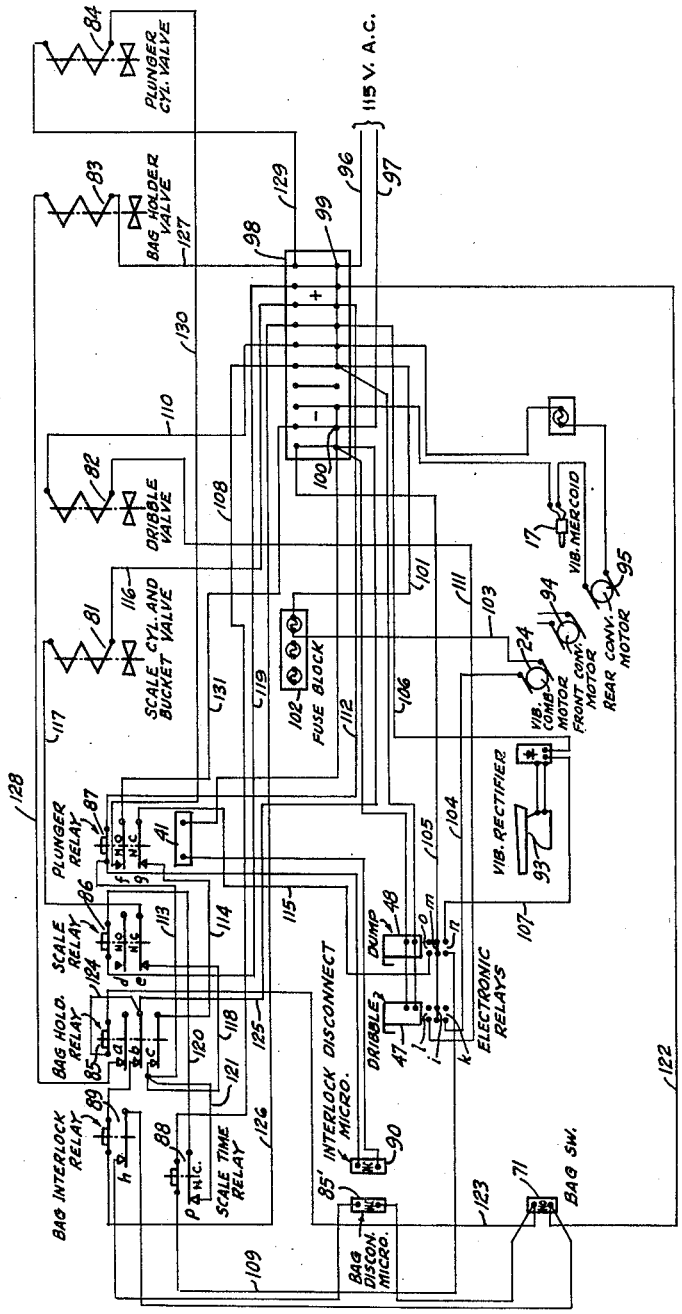
Figure 4:
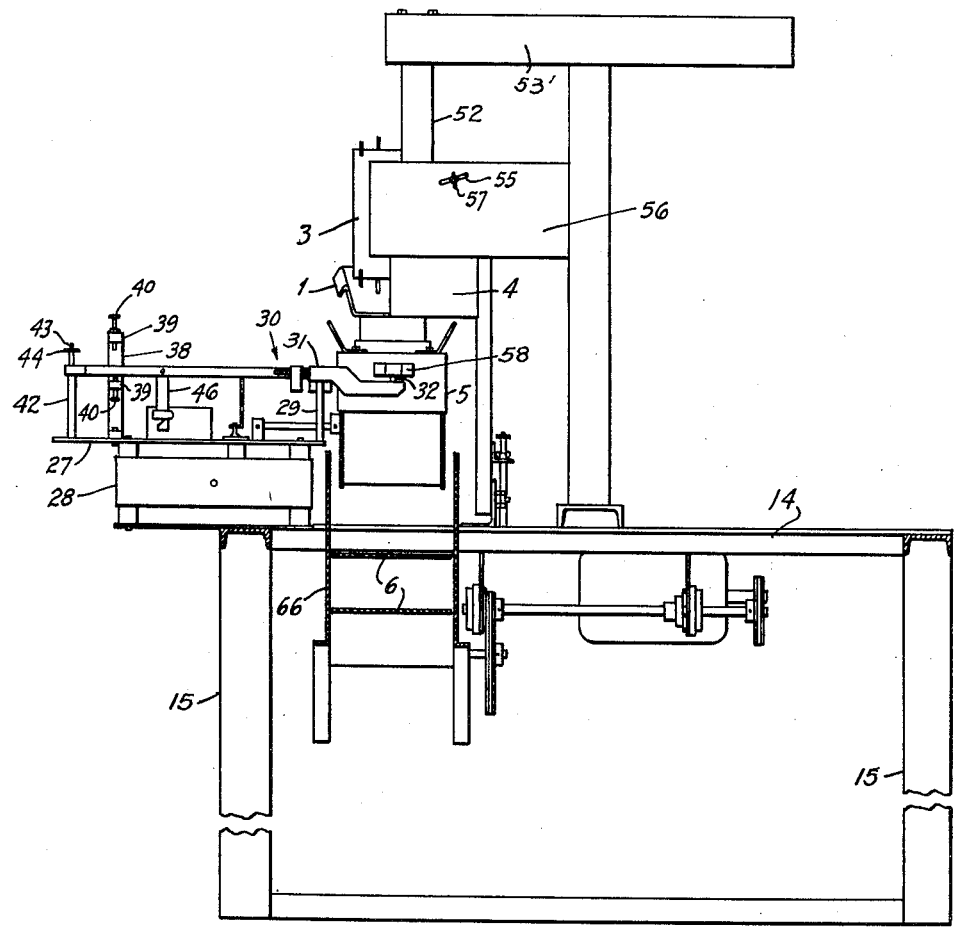
Figure 5:
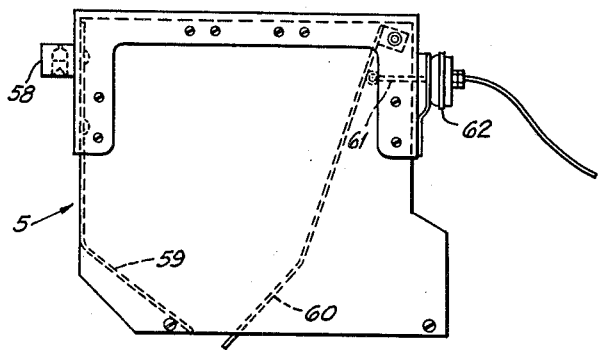

The preferred form of our invention is illustrated in the accompanying drawing, in which Figure 1 shows a side view of our machine,
Figure 2, a top plan view of the same,
Figure 3, a general wiring diagram,
Figure 4, a section taken along line 4—4 of Figure 1, and
Figure 5, an end view of a weighing bucket used in our machine.

While we have shown only the preferred form of our invention, we wish to have it understood that various changes and modifications may be made within the scope of the claims attached hereto without departing from the spirit of the invention.

Referring to the drawings in detail, our machine comprises in its principal features a vibrator 1, means for feeding material thereon shown at 2, a rotary comb 3 cooperating with the vibrator, a dribble feed gate 4 at the discharge end of the vibrator, a bucket 5 forming part of a weighing unit, a conveyor belt 6 adapted to receive the bucket discharge, a second rotary comb 7 cooperating with the conveyor belt, a bag holding hopper 8 adapted to receive the conveyor discharge, means shown at 9 for reciprocating the hopper, and a plunger 10 for levelling off the contents of the filled bag.

The vibrator 1 is of conventional construction and comprises a pan 11 for receiving and advancing material, and electrical vibrating means indicated at 12, the vibrator being supported on legs 13 rising from the main frame 14, which latter may be supported by legs 15.

Material is admitted to the pan of the vibrator through a chute 2, the flow of material being controlled by a vane 16 carrying a mercury switch 17. When too much material is admitted by the chute, it lifts the vane, and the mercury switch becomes active to stop a motor operating a feed conveyor (not shown) for the chute. As surplus material at the vane is disposed of, the vane drops, reverses the mercury switch and causes the feed conveyor to again become active.

The comb 3 comprises a cylindrical body having metallic teeth projecting from the surface thereof and is mounted over the bottom of the pan for cooperation therewith in levelling off the material and in breaking up bunch formations without causing too much breakage of the material. Where noodles are handled by the machine, the comb is made to rotate in the direction of the flow of the material and substantially at the same surface speed. Where potato chips are to be handled, the direction of rotation is preferably reversed.

The comb 3 is revolvably supported in an arm 18, pivoted as at 19, and the angularity of the arm may be adjusted by means of a bracket 20 projecting from the lower end of the arm and engaging over a fixed bolt 21, where it may be adjusted along the length of the bolt by means of a wing nut 22. The arm should be adjusted to hold the teeth of the comb in suitably spaced relation to the bottom of the vibrator bottom, depending upon the material used, and the downward adjustment of the comb is limited by a stop 23 at the upper end of the bolt.

The comb 3 is rotated by a vibrator comb motor 24 having a drive shaft 25 mounted coaxially with the arm pivot 19, through a chain connection shown at 26.

The vibrator 1 discharges, over its front end, into the bucket 5 forming part of a weighing apparatus. The latter comprises a plate 27 suitably supported on an understructure 28, with one edge of the plate running parallel to the vibrator but spaced sidewise with respect thereto, two ports 29 arranged along said edge and a balance 30 pivotally supported in the upper ends of the posts. The balance comprises a yoke 31, the base of which is supported over the posts, while the two arms project into the path of travel of the material and have the bucket 5 pivotally suspended therefrom as at 32.

The base of the yoke has three arms 33, 34 and 35 projecting therefrom in a direction opposite to that of the bucket supporting arms, these arms moving in unison, so that for the purposes of this invention they may be considered a single arm with three branches. The arm 34 carries a balance weight 36 for general balancing, and the arm 33 has a weight 37 slidable thereon, the latter weight being intended to set the scale for a desired amount of material. The plate 27 has a post 38 rising alongside of the arm 34, and this post has two flanges 39 projecting over the arm, one above and one below, with set screws 40 limiting the up and down movement of the arm. The outer end of the arm 34 terminates in a fork 41 adapted to straddle a post 42, which latter carries, on a conical portion 43 disposed at an elevation slightly above the lowermost position of the arm, a washer 44, adapted to be lifted by the arm, as the latter ascends under the weight of the material fed into the bucket.

The weight of this washer should be only a small percentage of that of the material to be weighed out and the addition of this weight should be compensated for in properly positioning the weight 37, so that the combined weight equals the desired weight of material. If, for instance, 10 ounces are to be weighed out, the main weight might be set for 9 ounces, with the washer weighing 1 ounce. The object of this arrangement is to cause a braking action toward the end of the bucket filling operation. After 9 ounces, in the above example, have been weighed out, the arm begins to rise, but its momentum is broken by the additional weight of the washer, whereby the downward movement of the bucket is delayed. This feature is of particular importance in combination with the dribble feed toward the end of the bucket filling operation to be described later.

The arm 35 of the balance carries two adjustable vanes 45 and 46 cooperable with electronic relays 47 and 48 in controlling the dribble feed and the material dumping operations to be hereafter described.

For fine adjustments we provide an eccentric weight 49 threaded on a short rod 50 projecting from the balance near its pivotal line. One revolution of the weight about its rod will add or detract a slight amount from the total weight setting.

The dribble feed is controlled by the gate 4 which is moved in front of the discharge end of the vibrator pan 11, by operation of the electronic relay 47 at the time the bucket begins to drop under the weight of the material fed thereinto. The time element is capable of fine adjustment by proper positioning of the vane 45 with respect to its supporting pivot.

The gate 4 is intended to partially close the discharge end of the vibrator pan only so as to reduce the discharge opening to a minor proportion of the total opening and to thereby reduce the feed to a mere dribble. Since substantially at the same time the downward momentum of the bucket is also reduced, by the picking up of the washer 44, the dribble feed has ample time to fill the bucket to the desired weight, and great accuracy is obtained in securing the exact weight desired.

The gate 4 is suspended from a plunger 51 reciprocable in a cylinder 52 and is operated by compressed air. The cylinder is pivotally suspended as at 53 from a fixed frame member 53' for sidewise swinging movement and its angular position may be adjusted by means of a screw 54 operating in a slot 55 in a fixed plate 56 and may be locked in adjusted position by a nut 57. Thus the gate opening of the dribble feed may be adjusted to a nicety by proper positioning of the gate 4.

The bucket 5 is shown in detail in Figure 5, which represents a rear view of the same. It is substantially rectangular in cross-section and has two sidewise projecting ears 58 by means of which it is suspended in the arms of the yoke of the balance. Its bottom is made up by a fixed inclined plate 59 and by a pivoted inclined gate 60, operable by a plunger 61 which is operated by a diaphragm in the housing 62 by means of air pressure, to move between bucket closing and dumping positions. The air flow is subject to the control of the electronic relay 48 which is adjusted to drop the load when the exact weight has been obtained.

An air-driven plunger 63 is mounted underneath the balance arm 34 and is made to move upward at the proper time for holding the bucket in dumping position until the latter has completely discharged.

The bucket discharges the load upon an inclined conveyor belt 6 running over rollers 64, the tension of the belt being adjustable in a conventional manner by means of a bolt 65. The conveyor belt is mounted in a channel-shaped housing 66. This belt carries the dumped load upward toward the hopper 8.

The comb 7 is mounted over the belt in a frame 67 pivoted coaxially with the upper roller 64 and adjustable by means of a chain 68, the free end of which engages in a fixed bracket 69. The function of this comb is to effect a controlled breakup of bunched material and to smooth out the flow of the latter so as to prevent bunching in the hopper.

The hopper has a chute 70 depending therefrom and a bag may be secured upon the chute in any suitable manner. One automatic means for applying the bags has been described in the co-pending application hereinabove referred to, and it is contemplated to develop additional means for this purpose, including pneumatic means for holding the bag. As in the machine previously described, the bag, upon application, closes a switch indicated in the wiring diagram at 71.

In order to effect proper settling of the material in the bag, we provide means for rapidly reciprocating the hopper vertically in a vibratory movement and to provide a cushioned stop near the end of each downward reciprocation. For this purpose the hopper is supported by means of two parallel cross-arms 72 pivoted to the frame and the hopper respectively, and the lower one of the arms is reciprocated by the plunger of the pneumatic engine 9, which is pivoted to the arm as at 73 and to the frame as at 74. The fluid drive allows the motion of the hopper to be arrested and in order to provide for a thumping action toward the end of the downward stroke, we secure a cushioning member 75 upon the frame and an arm 76 upon the hopper, the arm being made to strike the cushioning member just before the normal end of the downward stroke and causing the hopper to come to a sudden stop, whereby the momentum of the material in the bag is made to bring about a closer settling and nesting of the material.

After the load on the conveyor belt has been dumped into the bag, the plunger 10, which is also air-operated by means of the cylinder 77, is pushed down into the bag and levels off the surface of the material in the bag to a definite height.

The operation of the machine may be best explained by the wiring diagram of Figure 3. In this diagram the valve 81 operates the plunger 63 for locking the balance in dumping position, and also the dump gate 60 of the bucket. The valve 82 operates the gate 4 of the dribble feed. The valve 83 operates the bag holder mechanism, not described in detail. The valve 84 operates the plunger 10 in the cylinder 77.

The bag switch 71 closes when the bag is applied to the chute of the hopper. The bag disconnect micro switch 85' is in series with the bag interlock relay 89 and is normally closed. It is located on the plunger cylinder 77 and is made, by mechanical means, to open when the plunger reaches its most downward position in levelling off the contents of the bag.

The bag holder relay 85 closes the switches a, b and c when energized. The scale cylinder time delay relay 86 controls the switches d and e, the switch e being normally closed. Energizing of the relay causes the switch e to open and the switch d to close. The plunger time delay relay 87 also controls two switches f and g, the switch g being normally closed and the switch f being normally open. Upon the energizing of the relay the switch f closes and the switch g opens. The time delay in both relays 86 and 87 occurs between the energizing of the relay and the operation of the switches.

The scale time delay control relay 88 serves, at the end of the dumping operation, to release the locking plunger 63.

The bag interlock relay 89 operates the switch h and its object is to maintain the circuit operative, upon application of the bag, even though the switch 71 should momentarily open due to vibrations.

The interlock disconnect micro switch 90 maintains current in the relay coil 87, through its own electric interlock 91. The switch 90 is normally closed and the interlock 91 is normally open. The latter is closed by the energizing of the relay coil 87 and maintains current flowing through the latter coil.

The electronic switch 47 operates the switch i between two closed positions. Normally it closes the switch at k in which case it closes the circuit for the vibrator comb motor 24. When swung into the opposite direction, it disconnects at k and connects at l to operate the dribble gate valve 82.

The electronic dump relay 48 operates the switch m between contacts n and o. It normally closes the contacts at o, operating the coil of relay 88 and the rectifier 93 for the vibrator. When swung over to o, by the bucket having a full load, it locks the scales in the dump position, opens up the gate on the bucket and dumps the load.

The conveyor motor 94 operates continuously. A motor 95 for operating the main feed conveyor (not described) is subject to the control of the mercoid switch 17 on the vane 16 in the chute 2.

The electrical circuit is supplied by the line wires 96 and 97 connected to the positive and negative sides of the panel 98, as at 99 and 100.

The operation of the machine may be described as follows: Assuming that the machine has been standing idle and totally unloaded, the operator may find the plunger 10 in its uppermost position, the bucket 5 in its upper or filling position, the dribble gate 4 in its upper position, and the vane 16 down.

The operator turns on the main switch, a supply of compressed air having been previously obtained, and sets in motion the motor 95 driving the main conveyor (not shown). This motor runs continuously except when interrupted by the opening of the mercury switch 17 due to material bunching up under the vane 16. The motor 94 is connected into the main circuit directly and operates continuously to drive the conveyor 6 and its comb 7.

At the same time the switch i of the relay 47 connects to contact k, and a current flows from positive wire 101, through fuse block 102, wire 103, motor 24, wire 104, switch k—i and wire 105 back to negative. This drives the comb 3.

At the same time the relay 48 closes across n, the current flowing from wire 106 to the vibrator rectifier, wire 107, switch n—m and wire 105 back to negative. This circuit runs the vibrator. At the same time a current flows from wire 108 through relay coil 88, wire 109, contacts n—m and wire 105 to negative. This circuit holds the normally closed contacts at p in relay 88 open.

When a bag is applied to the chute 70 of the hopper, the switch 71 is closed, and a current flows through wire 122, switch 71, wire 123, relay 85, wire 124 and wire 125 back to negative. This causes the three switches 85, a, b, c to close. When b closes, current flows through wire 126 to relay 89, contact b and 125 to negative. This interlock relay serves to retain the circuit closed, even if switch 71 should open temporarily due to vibration or any other cause.

The switch 85, a closes a circuit including wire 127, bag holder valve solenoid 83, wire 128, switch a, and wire 125 to negative. This locks the bag to the chute.

Assuming material is now supplied to the machine, with a bag on the feed hopper 8, the feed advances from the main conveyor (not shown) through the chute 2 upon the vibrator 1 which dumps it into the bucket 5. As this bucket is almost full and begins to drop, at some designated time during the drop, the vane on switch 47 causes the latter to close, breaking contact i—k and making contact i—l. The breaking of the contacts i—k stops the vibrator comb 3 and the contacts i—l cause a current to flow through wire 110, the solenoid of the dribble valve 82, wire 111, contacts l—i and 105 to negative. This causes the dribble gate 4 to move toward closed position and causes the feed into the bucket to slow down.

During the same period the balance arm picks up the extra weight in the form of the washer 44, which slows down the descent of the bucket.

After the bucket has received its full weight, switch 48 closes, breaking contact n—m and establishing contact m—o. The breaking of the contact stops the vibrator and cuts off the relay 88, allowing switch p to close. The making of the contact m—o closes three circuits passing through the switch 85c. The first circuit includes wire 112, relay 87, wire 113, switch 85c, wire 114, contact 87g, wire 115, 48 o—m, and wire 105 to the negative. This energizes relay 87 for delayed operation of the plunger 10 through the valve 84, the circuit including wire 129, plunger solenoid 84, wire 130, contact 87f, and wire 131 to negative.

The second circuit comprises the wire 116, the solenoid of valve 81, wire 117, contact 86e and 85c and back as in the first circuit. This operates the valve 81 opening the bucket gate and setting the lock plunger 63 for the balance, for a predetermined delay.

The third circuit comprises wire 119, relay 86, wire 120, contacts 88p and wire 121 to contact 85c and return as in the first circuit. This permits the operation of relay 86 which opens contact at e, after a delay, and causes solenoid valve 81 to change position for closing the bucket gate and removing the balance lock plunger 63.

It will be noted that if no bag has been applied, the relay 85 has not been energized and switches a, b and c have not been closed.

We claim:

1. In a bag filling and weighing machine, a receiving bucket, a balance having a first arm and a second arm and having the bucket suspended from one arm thereof and having a balancing weight on the second arm, a vibrator pan having a normally open, horizontal discharge end disposed over the bucket, a frame member mounted above the discharge end, a cylinder swingably suspended from the frame member having a downwardly projecting plunger movable therein, a gate mounted on the lower end of the plunger and disposed normally over the feed end of the pan, and means for depressing the plunger for moving the gate into closing position with respect to the pan, the cylinder having means for adjusting the same to a desired angular position and the gate being formed to leave a dribble feed opening at the end of the pan, with the size of the opening depending upon the angular adjustment of the cylinder, and the weight-carrying arm of the balance having a minor weight mounted thereabove adapted to be picked up by said arm during the dribble feed to effect a braking action on the downward movement of the bucket, the movement of the bucket controlling the feeding means.

2. In a bag filling and weighing machine, a receiving bucket, a balance having a first arm and a second arm and having the bucket suspended from the first arm thereof and having a balancing weight on the second arm, means for feeding material into the bucket to cause the latter to descend when its weight exceeds that of the balancing weight, whereby the second arm is made to ascend, a post mounted with respect to the free end of the second arm so as to be straddled thereby and having a tapered end above the said arm when the latter is in normal position, and a washer loosely resting on the taper and operable to be picked up by the second arm as it ascends to place a braking action on the descent of the bucket, the movement of the bucket controlling the feeding means.

3. In combination, a material receiving means, a balance having a first arm and a second arm and having said means supported by the first arm thereof and having a balancing weight on the second arm, the first arm being operable to descend when the weight of the material fed into the receiving means exceeds that of the balancing weight whereby the second arm is made to ascend, a post mounted with respect to the free end of the second arm so as to be straddled thereby and having a tapered end above the said arm when the latter is in normal position, and a washer loosely resting on the taper and operable to be picked up by the second arm as it ascends to place a braking action on the descent of the material receiving means, the movement of said receiving means controlling the feeding means.

4. In a bag filling and weighing machine, a receiving bucket, a vibrator pan having a normally open, horizontal discharge end disposed over the bucket, a frame member mounted above the discharge end, a cylinder swingably suspended from the frame member and having a downwardly projecting plunger movable therein, a gate mounted on the lower end of the plunger and disposed normally over the feed end of the pan, and means for depressing the plunger for moving the gate into closing position with respect to the pan, the cylinder having means for adjusting the same to a desired angular position, and the gate being formed to leave a dribble feed opening at the end of the pan, with the size of the opening depending upon the angular adjustment of the cylinder.

References Cited in the file of this patent

UNITED STATES PATENTS

| | | |
|---|---|---|
| 556,258 | Doble | Mar. 10, 1896 |
| 576,583 | Jones | Feb. 9, 1897 |
| 589,081 | Giffith | Aug. 31, 1897 |
| 984,537 | Buschman | Feb. 21, 1911 |
| 1,071,385 | Bates | Aug. 26, 1913 |
| 1,083,959 | Vogelsong | Jan. 13, 1914 |
| 1,327,644 | Taylor | Jan. 13, 1920 |
| 1,823,283 | Neuman | Sept. 15, 1931 |
| 1,851,017 | Middelboe | Mar. 29, 1932 |
| 2,011,608 | Belknap | Aug. 20, 1935 |
| 2,033,586 | Noble | Mar. 10, 1936 |
| 2,040,660 | Lenhart | May 12, 1936 |
| 2,076,617 | Cleaves | Apr. 13, 1937 |
| 2,101,561 | Rapp | Dec. 7, 1937 |
| 2,248,725 | Stelzer | July 8, 1941 |
| 2,258,182 | Howard | Oct. 7, 1941 |
| 2,282,199 | Neuman | May 5, 1942 |
| 2,333,435 | Muskat | Nov. 2, 1943 |
| 2,336,347 | Clifford | Dec. 7, 1943 |
| 2,348,372 | Weckerly | May 9, 1944 |
| 2,352,114 | Muskat | June 20, 1944 |
| 2,385,233 | Robinson | Sept. 18, 1945 |
| 2,398,566 | Thomas | Nov. 20, 1945 |
| 2,398,887 | Drinnon | Apr. 23, 1946 |
| 2,458,228 | Vredenburg | Jan. 4, 1949 |
| 2,497,015 | Richardson | Feb. 7, 1950 |
| 2,566,210 | Kendall | Aug. 28, 1951 |
| 2,634,084 | McWaters | Apr. 7, 1953 |